United States Patent [19]
Han

[11] Patent Number: 6,094,225
[45] Date of Patent: Jul. 25, 2000

[54] METHOD AND APPARATUS FOR ENCODING MODE SIGNALS FOR USE IN A BINARY SHAPE CODER

[75] Inventor: Seok-Won Han, Seoul, Rep. of Korea

[73] Assignee: Daewoo Electronics, Co., Ltd., Rep. of Korea

[21] Appl. No.: 08/984,037

[22] Filed: Dec. 2, 1997

[51] Int. Cl.[7] .................................................. H04N 7/12
[52] U.S. Cl. .......................... 348/416; 348/413; 348/699; 382/239
[58] Field of Search .................................... 348/401, 400, 348/420, 421; 382/232, 236, 439, 415, 412, 413, 416, 699, 239

[56] References Cited

U.S. PATENT DOCUMENTS

| | | | |
|---|---|---|---|
| 4,546,386 | 10/1985 | Matsumoto et al. | 348/412 |
| 5,461,421 | 10/1995 | Moon | 348/402 |
| 5,534,927 | 7/1996 | Shishik et al. | 348/400 |
| 5,553,166 | 9/1996 | Kakutani | 382/252 |
| 5,666,461 | 9/1997 | Igarashi et al. | 348/400 |
| 5,740,283 | 4/1998 | Meeker | 382/248 |
| 5,751,363 | 5/1998 | Miyamoto | 348/416 |
| 5,832,124 | 11/1998 | Sato et al. | 382/238 |
| 5,859,668 | 1/1999 | Aono et al. | 348/416 |
| 5,929,915 | 7/1999 | Cho | 348/416 |

FOREIGN PATENT DOCUMENTS

| | | |
|---|---|---|
| 0618731 | 10/1994 | European Pat. Off. . |
| 9015506 | 12/1990 | WIPO . |

OTHER PUBLICATIONS

N. Brady et al., "Context–Based Arithmetic Encoding of 2D Shape" Proceedings of The International Conference on Image Processing, Oct. 26–29, 1997, pp. 29–32.

Ostermann J, "Methodologies Used for Evaluation of Video Tools and Algorithms in MPEG–4" Signal Processing. Image Communication, May 1997, vol. 9, No. 4, pp. 343–365.

Sikora T, "Entwicklung Eines MPEG–4 Video–Standards: Das MPEG–4 Video–Verifikationsmodell" Fernseh Und Kinotechnik, Aug. 1996, vol. 50, No. 8/09, pp. 439/440, 442–444, 446–448.

Primary Examiner—Leo H. Boudreau
Assistant Examiner—Gregory Desire'
Attorney, Agent, or Firm—Anderson Kill & Olick

[57] ABSTRACT

A method for encoding mode signals of a target block of M×N pixels having a binary value '0' or '255' is provided. If the target block is determined as neither "all_0" nor "all_255", either a frame-based coding or a field-based coding is selected to generate a coding mode signal, wherein the frame-based coding represents the target block is encoded on an M×N pixels basis and the field-based coding represents the target block is encoded on an M/2×N pixels basis, and a base mode of the target block based on the "all_0", "all_255" and/or the coding mode signal. If the frame-based coding is selected, a frame mode is generated. On the contrary, if the field-based coding is selected, the frame is divided into a top and a bottom fields so that a top mode for the top field and a modified bottom mode for the bottom field are obtained, wherein a bottom mode is modified by the top mode to be the modified bottom; and the top mode and the modified bottom mode are attached to be a field mode.

16 Claims, 3 Drawing Sheets

METHOD AND APPARATUS FOR ENCODING MODE SIGNALS FOR USE IN A BINARY SHAPE CODER

FIELD OF THE INVENTION

The present invention relates to a method and apparatus for encoding mode signals of a binary shape signal; and, more particularly, to a method and apparatus for encoding mode signals based on either a frame-based coding or a field-based coding.

DESCRIPTION OF THE PRIOR ART

In digitally televised systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is necessary to compress or reduce the volume of data through the use of various data compression techniques, especially in the case of such low bit-rate video signal encoders as video-telephone and teleconference systems.

One of such techniques for encoding video signals for a low bit-rate encoding system is the so-called object-oriented analysis-synthesis coding technique, wherein an input video image is divided into objects, and three sets of parameters for defining the motion, contour and pixel data of each object are processed through different encoding channels.

One example of such object-oriented coding scheme is the so-called MPEG (Moving Picture Experts Group) phase 4 (MPEG-4), which is designed to provide an audio-visual coding standard for allowing content-based interactivity, improved coding efficiency and/or universal accessibility in such applications as low-bit rate communication, interactive multimedia (e.g., games, interactive TV, etc.) and area surveillance.

According to MPEG-4, an input video image is divided into a plurality of video object planes (VOP's), which correspond to entities in a bitstream that a user can have an access to and manipulate. A VOP can be referred to as an object and represented by a bounding rectangle whose width and height may be the smallest multiples of 16 pixels (a macroblock size) surrounding each object so that the encoder may process the input video image on a VOP-by-VOP basis.

A VOP described in MPEG-4 includes shape information and color information consisting of luminance and chrominance data, wherein the shape information represented in binary shape signals is referred to as an alpha plane. The alpha plane is partitioned into a plurality of binary alpha blocks, wherein each binary alpha block (BAB) has 16×16 binary pixels. Each of the binary pixels is classified as either a background pixel or an object pixel, wherein the background pixel located outside the object in the alpha plane is used to be assigned with a binary pixel value, e.g., 0, while the object pixel inside the object is used to be assigned with another binary pixel value, e.g., 255.

Each of the binary pixels in the BAB may be encoded by using a conventional bit-map-based shape coding method such as a context-based arithmetic encoding (CAE) discipline. For instance, in an intra mode, all binary pixels of a BAB are encoded by using an intra CAE discipline to thereby generate an intra coded BAB, wherein a context value for each binary pixel of the BAB in the intra CAE discipline is calculated by using binary pixel values of a predetermined number, e.g., 10 of binary pixels surrounding said each binary pixel in the BAB. While, in an inter mode, all binary pixels of a current BAB is encoded by using an inter CAE discipline to thereby generate an inter encoded BAB, wherein a context value of each binary pixel of the current BAB in the inter CAE discipline is calculated by using binary pixel values of a predetermined number, e.g., 4 of binary pixels surrounding said each binary pixel in the current BAB and binary values of a predetermined number, e.g., 5 of binary pixels within a bordered motion compensated BAB (see *MPEG-4 Video Verification Model Version 7.0*, International Organisation for Standardisation, Coding of Moving Pictures And Associated Audio Information, ISO/IEC JTC1/SC29/WG11 MPEG97/N1642, Bristol, April 1997, pp 28–30).

Meanwhile, in the conventional binary shape encoding discipline, a mode signal representing or characterizing a corresponding encoding condition for the BAB is encoded to improve the coding efficiency, thereby generating and then transmitting a corresponding encoded mode signal.

For example, if all of the binary pixels within a BAB are object pixels, instead of encoding binary pixel values of the object pixels to generate encoded binary pixel values to be transmitted, it will be preferable to encode a mode signal informing that all of the binary pixels within the BAB are object pixels. By employing the method described above, it is possible to enhance the coding efficiency by transmitting the corresponding encoded mode signal as binary shape information for the BAB.

Referring to Table 1, there are 7 number of modes for the binary alpha information of a BAB according to a conventional mode coding discipline, wherein a motion vector difference for shape (MVD) of the BAB is a difference between a motion vector for shape (MV) and a motion vector predictor for shape (MVP); and the MVP is determined by using a conventional motion estimation discipline (see *MPEG-4 Video Verification Model Version 7.0*, International organization for Standardization, Coding of Moving Pictures And Associated Audio Information, ISO/IEC JTC1/SC29/WG11 MPEG97/N1642, Bristol, April 1997, pp 20–23.

TABLE 1

| mode | coding condition |
| --- | --- |
| 1 | MVD==0 && no_update |
| 2 | MVD!=0 && no_update |
| 3 | MVD==0 && inter_CAE |
| 4 | MVD!=0 && inter_CAE |
| 5 | intra_CAE |
| 6 | all_0 |
| 7 | all_255 |

In Table 1, mode 1 represents that a motion vector difference for shape (MVD) for the BAB is defined as zero and all the binary pixels within the BAB need not be encoded; mode 2 describes that the MVD is not defined as zero and all the binary pixels within the BAB need not be encoded; mode 3 tells that the MVD is defined as zero and all the binary pixels within the BAB has been encoded by the inter CAE discipline; mode 4 signifies that the MVD is not defined as zero and all the binary pixels within the BAB has been encoded by the inter CAE discipline; mode 5 implies that all the binary pixel within the BAB has been encoded by the intra CAE discipline; mode 6 tells that all the binary pixels within the BAB are defined as background pixels; and mode 7 represents that all the binary pixels within the BAB are defined as object pixels.

Conventional binary shape encoding methods employing the conventional mode coding method described above are basically progressive coding methods. Namely, in the conventional binary shape encoding methods, an interlaced coding technique performed by using field-by-field basis motion estimation method has not been used. Hence, even if spatial and/or temporal correlation between frames is lower than that of fields, the interlaced coding technique has not been employed, thereby limiting the capability of enhancing the coding efficiency thereof.

SUMMARY OF THE INVENTION

It is, therefore, a primary object of the present invention to provide a method and apparatus for coding mode signals efficiently by performing either a progressive coding or an interlaced coding adaptively.

It is another primary object of the present invention to provide a method and apparatus for coding mode signals efficiently in the interlaced coding by modifying a bottom mode of the bottom field by a top mode of the top field.

In accordance with the present invention, there is provided a method for encoding mode signals of a target block of a binary shape signal, wherein the binary shape signal includes a plurality of pictures, each picture is divided into a multiplicity of blocks of M×N pixels having one of a first and a second binary values and the target block is encoded by either a frame-based coding to be encoded on an M×N pixels basis or a field-based coding to be encoded on an M/2×N pixels basis, the target block representing one of the blocks of a current picture to be encoded and M and N being positive even integers, respectively, comprising the steps of:

(a) generating a first indication signal, if error of the target block with respect to a first reference block is not greater than a predetermined threshold, and generating a second indication signal, if error of the target block with respect to a second reference block is not greater than the predetermined threshold, the respective reference blocks having M×N pixels and all pixels of the first and the second reference blocks being of the first and the second binary values, respectively;

(b) if none of the first and the second indication signals are generated in step (a), selecting either the frame-based coding or the field-based coding to generate a coding mode signal, wherein the coding mode signal indicates whether the target block is encoded by using either the frame-based coding or the field-based coding;

(c) generating a base mode of the target block based on the first and the second indication signals and the coding mode signal;

(d) if the frame-based coding is selected in step (b), coding the target block by the frame-based coding to generate a frame mode and frame-coded data, wherein the frame mode represents a coding condition of the frame-coded data;

(e) if the field-based coding is selected in step (b), coding the target block by the field-based coding to generate a field mode and field coded data; and (f) combining the base mode and the frame mode or the field mode to generate a mode signal for transmission of the target block.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
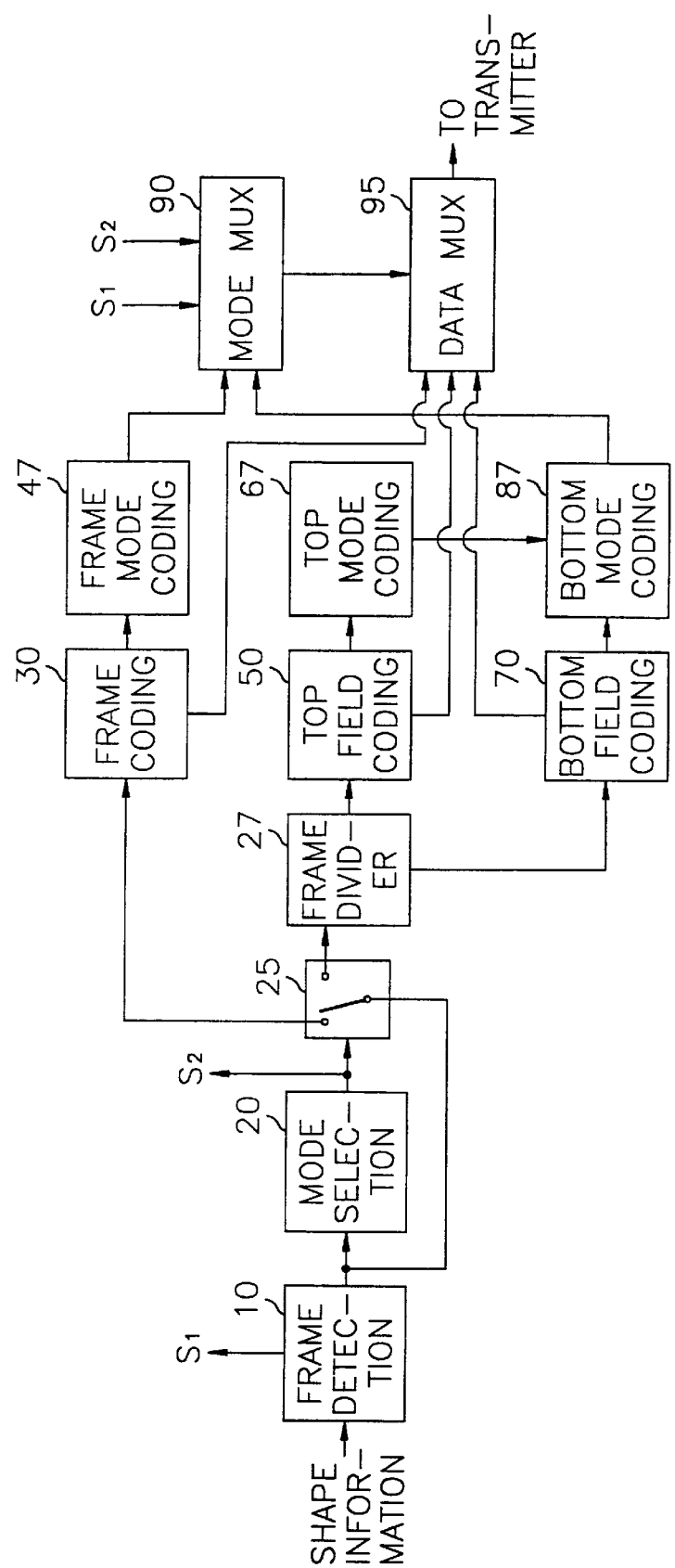
FIG. 1 illustrates an apparatus for coding modes of shape information on a binary alpha block (BAB) basis in accordance with the preferred embodiment of the present invention.

Referring to FIG. 1, there is illustrated an apparatus for coding modes of shape information on a binary alpha block (BAB) basis in accordance with the preferred embodiment of the present invention, wherein the shape information represented in binary shape signals is referred to as an alpha plane. The alpha plane is partitioned into a plurality of binary alpha blocks and the binary alpha blocks are provided as the shape information to a frame detection block 10, wherein each binary alpha block (BAB) has 16×16 binary pixels.

The frame detection circuit 10 examines whether a coding mode of each BAB is either "all_0" or "all_255". Specifically, a BAB is preferably partitioned into 16 number of subblocks of 4×4 pixels. If all errors between all subblocks of the BAB and an all_0 subblock are smaller than or equal to a predetermined threshold, all the binary pixels of the BAB are changed to background pixels with a pixel value '0' and an indication signal $S_1$='all_0' indicating that the BAB is defined as "all_0" is provided to a mode multiplexor (MUX) 90, wherein the all_0 subblock is a subblock whose binary pixel values are all '0'. If all errors between all subblocks of the BAB and an all_255 subblock are smaller than or equal to the predetermined threshold, all the binary pixels of the BAB are changed to object pixels with a pixel value '255' and an indication signal $S_1$='all_255' indicating that the BAB is defined as "all_255" is provided to the mode MUX 90, wherein the all_255 subblock is a subblock whose binary pixel values are '255'.

If the coding mode of the BAB is neither "all_0" nor "all_255", the BAB'B of the alpha plane are provided to a mode selection circuit 20 and a switch 25. The mode selection circuit 20 determines whether the BAB is encoded on either a frame basis or a field basis; generates a coding mode signal $S_2$ indicating the BAB is encoded on either a frame basis or a field basis; and provides the coding mode signal $S_2$ to the switch 25 and the mode MUX 90. The mode MUX 90 generates a base mode signal for the BAB based on the indication signal $S_1$ and the coding mode signal $S_2$.

Referring to Table 2, there are exemplarily illustrated 4 number of base mode signals generated in the mode MUX 90.

TABLE 2

| base mode | base mode signal |
|---|---|
| all_0 | 00 |
| all_255 | 01 |
| field mode | 10 |
| frame mode | 11 |

In the switch 25, the BAB is switched to either a frame coding circuit 30 or a frame divider 27 based on the coding mode signal $S_2$. Specifically, if the BAB is encoded on a frame basis, the BAB is provided as BAB frame data to frame coding circuit 30 and, if otherwise, the BAB is provided to the frame divider 27.

Figure 2:
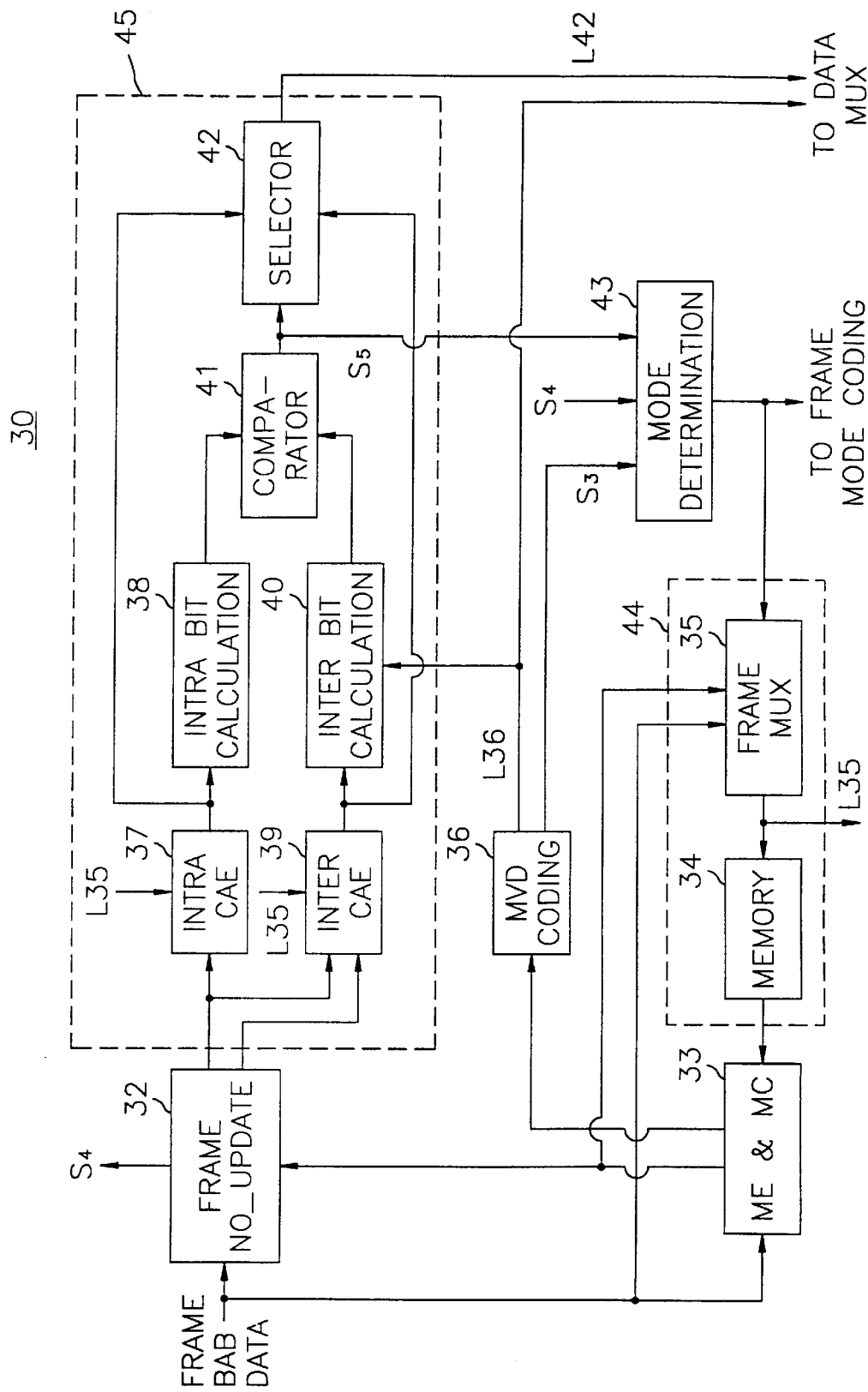
FIG. 2 shows a detailed block diagram of frame coding circuit shown in FIG. 1.

Referring to FIG. 2, there is illustrated a detailed block diagram of the frame coding circuit shown in FIG. 1, wherein the BAB frame data is provided as a current BAB to a frame no_update circuit 32, a motion estimation and motion compensation (ME & MC) circuit 33, and a frame MUX 35 within a frame reconstruction unit 44.

The ME & MC circuit 33 determines a motion vector predictor (MVP) of the current BAB based on candidate MVP's retrieved from a memory 34 in the frame reconstruction unit 44; computes a motion vector (MV) and a motion vector difference (MVD) of the current BAB; carries out a motion compensation according to the MV to generate a bordered motion compensated (bordered MC) block; and provides the MVD and the bordered MC block to a MVD coding circuit 36 and the frame no_update circuit 32, respectively, wherein the MVD represents a displacement between the MV and the MVP and the bordered MC block represents both a motion compensated BAB (MC BAB), obtained by displacing each binary pixel of a previous BAB corresponding to the MVP with the MV, and a border of width 1 pixel around the MC BAB (see *MPEG-4 Video Verification Model Version 7.0*, International organization for Standardization, Coding of Moving Pictures And Associated Audio Information, ISO/IEC JTC1/SC29/WG11 MPEG97/N1642, Bristol, April 1997, pp 20–23).

The MVD coding circuit 36 generates an MVD signal $S_3$ indicating whether or not the MVD is equal to '0' to provide the MVD signal $S_3$ to the mode determination circuit 43 and, if the MVD is not equal to '0', the MVD coding circuit 36 encodes the MVD of the current BAB to provide the encoded MVD data itself to an inter bit calculation circuit 40 within a context_based arithmetic encoding unit(CAE unit) 45 and a data MUX 95 via a line L36.

In the meantime, the frame no_update circuit 32 determines whether the current BAB is identical to the MC BAB and provides a no_update signal $S_4$ indicating whether or not the current BAB must be encoded to the mode determination circuit 43. First of all, the frame no_update circuit 32 separates the current BAB into 16 number of current subblocks and partitions the MC BAB into 16 number of MC subblocks, wherein each of the current and MC subblocks has 4×4 pixels and the MC BAB field is obtained by discarding the border of width 1 pixel around the bordered MC BAB. The frame no_update circuit 52 determines whether each error between each of the current BAB subblocks and its corresponding MC subblock is smaller than or equal to the predetermined threshold. If all the errors are smaller than or equal to the predetermined threshold, it is reasonable that the current BAB will not be encoded so that the signal $S_4$ indicates no_update.

On the contrary, if at least one error among errors between the BAB subblocks and their corresponding MC subblocks are greater than the predetermined threshold, i.e., if the current BAB must be coded as described below, the frame no_update circuit 32 provides the current BAB to an intra context_based arithmetic encoding (intra CAE) circuit 37 and an inter CAE circuit 39 within the CAE unit 45 and provides the bordered MC BAB to the inter CAE circuit 39.

The intra CAE circuit 37 encodes all the binary pixels of the current BAB based on 3 number of adjacent reconstructed BAB's retrieved via a line L35 from a frame MUX 35 within the reconstruction unit 44 by using the conventional intra CAE discipline, wherein each adjacent reconstructed BAB, adjacent to the current BAB in a top-left, a top or a left direction, includes 16×16 reconstructed pixels. In the conventional intra CAE discipline, an intra context value for each binary pixel of the current BAB is calculated by using binary pixel values of a predetermined number, e.g., 10 of candidate binary pixels surrounding said each binary pixel, wherein the candidate binary pixels are selected among all the reconstructed pixels in the 3 adjacent reconstructed BAB's and one or more intra encoded current pixels, if any, having already been encoded by the intra CAE discipline, and said each binary pixel is encoded based on the intra context value to be an intra encoded pixel for said each binary pixel. All the intra encoded pixels are provided as intra CAE data to an intra bit calculation circuit 38 and a selector 42.

The intra bit calculation block 38 calculates the number of bits which are needed to represent the intra CAE data and provides the number of bits of the intra CAE data to a comparator 41.

In the meantime, the inter CAE circuit 39 encodes all binary pixels of the current BAB based on the adjacent reconstructed BAB's retrieved via the line L35 and the bordered MC BAB by using an inter CAE discipline. In the inter CAE discipline, an inter context value of each binary pixel in the current BAB is calculated by using binary pixel values of a predetermined number, e.g., 4 of reconstructed binary pixels surrounding said each binary pixel in the current BAB and binary values of a predetermined number, e.g., 5 of bordered MC binary pixels within a bordered motion compensated BAB, and said each binary pixel is encoded based on the inter context value to generate inter encoded pixel for said each binary pixel. All the inter encoded pixels are provided as inter CAE data to the inter bit calculation circuit 40 and the selector 42.

The inter bit calculation circuit 40 calculates the number of bits which are needed to represent both the inter CAE data and the encoded MVD data, if any, and provides the same number of bits to the comparator 41.

In the comparator 41, if the number of bits of the intra CAE data is smaller than that of the inter CAE data and the encoded MVD data, an intra/inter signal $S_5$ representing the intra CAE data is provided to the selector 42 and the mode determination circuit 43; and if otherwise, the intra/inter signal $S_5$ representing the inter CAE data and the encoded MVD data is provided.

In response to the intra/inter signal $S_5$, the selector 42 selects either the intra CAE data or the inter CAE data and the encoded MVD data to thereby provide the selected result to the data MUX 95.

In the meantime, the mode determination circuit 43 determines a frame coding mode of the current BAB based on the signals $S_3$, $S_4$ and $S_5$ and provides the frame coding mode to the frame MUX 35 within the frame reconstruction unit 44 and a frame mode coding circuit 47 shown in FIG. 1.

In response to the frame coding mode from the mode determination circuit 43, the frame MUX 35 reconstructs the current BAB to generate a reconstructed BAB. In other words, the frame MUX 35 displaces the current BAB itself or the MC BAB among the bordered MC BAB fed from the ME & MC circuit 33 with the reconstructed BAB based on the frame coding mode. The reconstructed BAB is provided from the frame MUX 35 to the memory 34, the intra CAE circuit 37 and an inter CAE circuit 39 via the line L35 for the processing of a next BAB frame data.

Referring back to FIG. 1, the frame mode coding circuit 47 generates a frame mode signal for the current BAB based on a conventional statistical coding technique to provide the frame mode signal to the mode MUX 90.

TABLE 3

| frame coding mode | frame mode signal |
|---|---|
| MVD==0 && no_update | 0 |
| MVD!=0 && no_update | 110 |
| MVD==0 && inter_CAE | 10 |
| MVD!=0 && inter_CAE | 1110 |
| intra_CAE | 1111 |

Referring to Table 3, there are exemplarily illustrated 5 number of frame mode signals for the frame BAB in accordance with the frame coding mode based on the signals $S_3$, $S_4$ and $S_5$, wherein a motion vector difference for shape (MVD) of the frame BAB is a difference between a motion vector for shape (MV) and a motion vector predictor for shape (MVP); and the MVP is determined by using a conventional motion estimation discipline.

On the contrary, if the BAB is provided from the switch 25 to the frame divider 27 in order to be encoded on a field basis in response to the coding mode signal $S_2$, the frame divider 27 divides the BAB into a top and a bottom field BAB's, wherein the top field BAB preferably contains every odd row of the BAB and the bottom field BAB contains every even row of the BAB, and provides the top and the bottom field BAB's as field BAB data to a top and a bottom field coding circuits 50 and 70, respectively. If the BAB has 16×16 pixels, it is reasonable that each of the top and the bottom field BAB's has 8×16 pixels. The top field coding circuit 50 is substantially identical to the bottom field coding circuit 70 so that a representative field coding circuit is described as follows.

Figure 3:
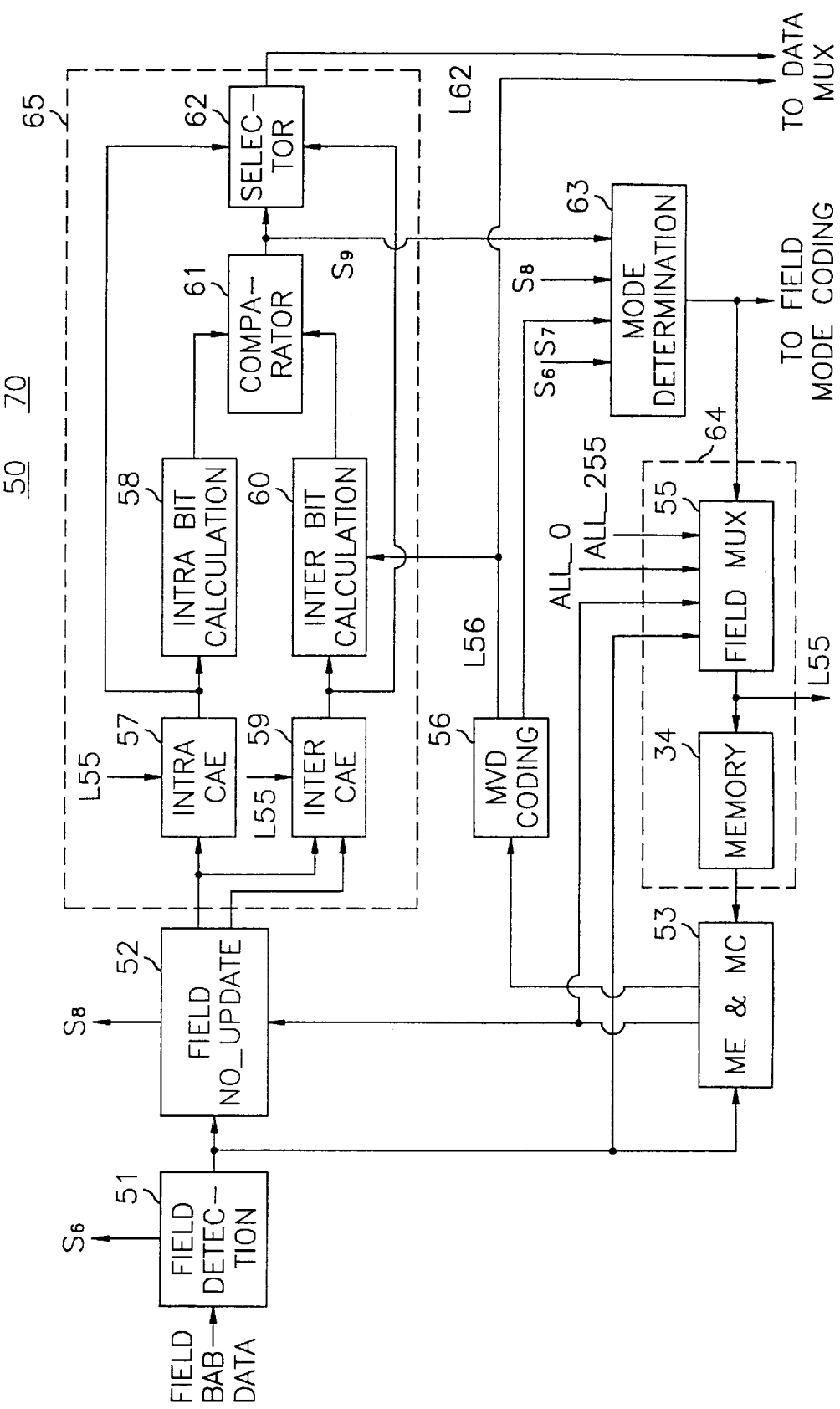
FIG. 3 represents a detailed block diagram of field coding circuit shown in FIG. 1.

Referring to FIG. 3, there is illustrated a detailed block diagram of the top/bottom field coding circuit shown in FIG. 1, wherein the field BAB data is provided as a current field BAB to a field detection circuit 51. The field coding circuit is similar to the frame coding circuit so that the field coding circuit is briefly illustrated as follows.

The field detection circuit 51 examines a coding mode of each current field BAB on a field-by-field basis to check if the coding mode is either one of "all_0" and "all_255". If the coding mode of the current field BAB is either one of "all_0" and "all_255", an indication signal $S_6$ indicating the current field is defined as either one of "all_0" and "all_255" is provided to a mode determination circuit 63. If the coding mode of the current field BAB is neither "all_0" nor "all_255", the current field BAB is provided to a field no_update circuit 52, an ME & MC circuit 53, and a field MUX 55 within a field reconstruction unit 64.

The ME & MC circuit 53 determines a motion vector predictor (MVP) of the current field BAB based on candidate MVP's retrieved from the memory 34 in the field reconstruction unit 64 in accordance with the conventional MPEG-4 discipline, wherein each candidate MVP is preferably selected among reconstructed bottom field BAB's of the reconstructed frame BAB's in the memory 34. The memory 34 is commonly owned by the top field coding circuit 50, the bottom field coding circuit 70 and the frame reconstruction unit 44 of the frame coding circuit 30 shown in FIG. 2. After computing the MV and the MVD of the current field BAB, the ME & MC circuit 53 provides the MVD and a bordered MC field block to a MVD coding circuit 56 and the field no_update circuit 52, respectively, wherein the MVD represents a displacement between the MV and the MVP and the bordered MC field block represents both a MC field BAB and a border of width 1 pixel around the MC field BAB. The MC field BAB for the top or the bottom field BAB is obtained by displacing each binary pixel of a top or a bottom field BAB of a previous BAB corresponding to the MVP by the MV.

The MVD coding circuit 56 which is substantially identical to the MVD coding circuit 36 of the frame coding circuit provides an MVD signal $S_7$ indicating whether or not the MVD is equal to '0' to the mode determination circuit 63 and, if any, encodes the MVD of the current field BAB to provide the encoded MVD data itself to an inter bit calculation circuit 60 within a CAE unit 65 and the data MUX 95 via a line L56.

In the meantime, the field no_update circuit 52 provides a no_update signal $S_8$ to the mode determination circuit 63, wherein the no_update signal $S_8$ indicates whether or not the current field BAB is identical to the MC field BAB so that the current field BAB must be encoded. If the current field BAB is identical to the MC field BAB, it is reasonable that the current BAB will not be encoded so that the signal $S_8$ indicates no_update. On the contrary, if the current BAB must be encoded as described below, the field no_update circuit 52 provides the current field BAB and the bordered MC field BAB to the CAE unit 65 in a similar manner described before for the frame coding circuit 30, except replacing the word "frame" with the word "field".

The CAE unit 65 of the top/bottom field coding circuit 50 and 70 is substantially identical to the CAE unit 45 of the frame coding circuit 30 shown in FIG. 2 and the CAE unit 65 of the top/bottom field coding circuit 50 and 70 similarly includes an intra CAE circuit 57, an intra bit calculation circuit 58, an inter CAE circuit 59, the inter bit calculation circuit 60, a comparator 61 and a selector 62. From the comparator 61, an intra/inter signal $S_9$ indicating whether or not the intra CAE data for the current field BAB is preferable to the inter CAE data is provided to the selector 62 and the mode determination circuit 63, and, in response to the intra/inter signal $S_9$, the selector 62 selects either the intra CAE data or the inter CAE data to thereby provide the selected result to the data MUX 95.

In the meantime, the mode determination circuit 63 determines a field coding mode of the current field BAB based on the signals $S_6$. $S_7$, $S_8$ and $S_9$ and provides the field coding mode to the frame MUX 55 within the reconstruction unit 64. The field coding mode is also provided to a top mode coding circuit 67 from the top field coding circuit 50 or a bottom mode code circuit 87 from the bottom field coding circuit 70 as shown in FIG. 1.

In response to the field coding mode from the mode determination circuit 63, the frame MUX 55 reconstructs the current field BAB. In other words, in response to the field coding mode, the frame MUX 55 replaces any of an "all_0" field BAB, an "all_255" field BAB, the current field BAB itself fed from the field detection circuit 51 and the MC field BAB fed from the ME & MC circuit 53 with the reconstructed field BAB for the current field BAB. The reconstructed field BAB is provided from the field MUX 55 to the memory 34, the intra CAE circuit 57 and the inter CAE circuit 59 via the line L55 for the processing of next field BAB data.

Referring back to FIG. 1, the top mode coding circuit 67 generates a top mode signal for the current top field BAB based on the conventional statistical coding technique to provide the top mode signal to the bottom mode coding circuit 87.

TABLE 4

| top mode | top mode signal |
|---|---|
| MVD==0 && no_update (T1) | 11110 |
| MVD!=0 && no_update (T2) | 110 |
| MVD==0 && inter_CAE (T3) | 10 |
| MVD!=0 && inter_CAE (T4) | 0 |
| intra_CAE (T5) | 1110 |
| all_0 (T6) | 111110 |
| all_255 (T7) | 111111 |

Referring to Table 4, there are exemplarily illustrated 7 number of top mode signals for the top field BAB in accordance with the top coding mode based on the signals $S_6$, $S_7$, $S_8$ and $S_9$, wherein T1 represents a first top mode indicating that a motion vector difference for shape (MVD) for the BAB is defined as zero and all the binary pixels within the BAB need not be encoded and so on.

The bottom mode coding circuit 87 generates a modified bottom mode signal for the current bottom field BAB based on the conventional statistical coding technique, wherein the modified bottom mode signal is determined depending on the top mode signal; and attaches the top mode signal to the modified bottom mode signal to provide the attached mode signal as a field mode signal to the mode MUX 90.

TABLE 5

|  |  | top mode |  |  |  |  |  |  |
|---|---|---|---|---|---|---|---|---|
|  |  | T1 | T2 | T3 | T4 | T5 | T6 | T7 |
| bottom | B1 | 0 | 10 | 11110 | 11110 | 11110 | 11110 | 11110 |
| mode | B2 | 10 | 0 | 1110 | 1110 | 1110 | 1110 | 1110 |
|  | B3 | 1110 | 1110 | 10 | 10 | 110 | 10 | 10 |
|  | B4 | 110 | 110 | 0 | 0 | 10 | 0 | 0 |
|  | B5 | 111111 | 111111 | 110 | 110 | 0 | 110 | 110 |
|  | B6 | 11110 | 11110 | 111111 | 111111 | 111111 | x | 11111 |
|  | B7 | 111110 | 111110 | 111110 | 111110 | 111110 | 11111 | x |

Referring to Table 5, there are exemplarily illustrated 47 number of modified bottom mode signals for the bottom field BAB modified by the 7 top mode signals, wherein the B1 represents a first bottom mode indicating that a motion vector difference for shape (MVD) for the BAB is defined as zero and all the binary pixels within the BAB need not be encoded and so on. Bi is to the bottom field what Ti is to the top field, i being 1 to 7. There is no "all_0" in the bottom mode for the sixth top mode T6, because the "all_0" for the frame BAB has already been checked in the frame detection circuit 10.

Referring back to FIG. 1, after generating a base mode signal based on the indication signal $S_1$ and the coding mode signal $S_2$ as described above, the mode MUX 90 multiples the frame and the field mode signals based on the base mode signal to provide a mode signal to the data mux 95.

The data MUX 95 multiplies the frame encoded data and the top by the bottom field encoded data based on the mode signal to provide the multiplexed data to the transmitter (not shown).

While the present invention has been described with respect to certain preferred embodiments only, other modifications and variations may be made without departing from the spirit and scope of the present invention as set forth in the following claims.

What is claimed is:

1. A method for encoding mode signals of a target block of a binary shape signal, wherein the binary shape signal includes a plurality of pictures, each picture is divided into a multiplicity of blocks of M×N pixels having one of a first and a second binary values and the target block is encoded by either a frame-based coding to be encoded on an M×N pixels basis or a field-based coding to be encoded on an M/2×N pixels basis, the target block representing one of the blocks of a current picture to be encoded and M and N being positive even integers, respectively, comprising the steps of:

(a) generating a first indication signal, if error of the target block with respect to a first reference block is not greater than a predetermined threshold, and generating a second indication signal, if error of the target block with respect to a second reference block is not greater than the predetermined threshold, the respective reference blocks having M×N pixels and all pixels of the first and the second reference blocks being of the first and the second binary values, respectively;

(b) if none of the first and the second indication signals are generated in step (a), selecting either the frame-based coding or the field-based coding to generate a coding mode signal, wherein the coding mode signal indicates whether the target block is encoded by using either the frame-based coding or the field-based coding;

(c) generating a base mode of the target block based on the first and the second indication signals and the coding mode signal;

(d) if the frame-based coding is selected in step (b), coding the target block by the frame-based coding to generate a frame mode and frame-coded data, wherein the frame mode represents a coding condition of the frame-coded data;

(e) if the field-based coding is selected in step (b), coding the target block by the field-based coding to generate a field mode and field coded data; and (f) combining the base mode and the frame mode or the field mode to generate a mode signal for transmission of the target block.

2. The method according to claim 1, wherein the step (e) includes the steps of:

(e1) dividing the target block into a top field and a bottom field, wherein the top field contains every odd row of the target block to have M/2×N pixels and the bottom field contains every even row of the target block to have M/2×N pixels;

(e2) coding the top field to generate a top mode and top field-coded data, wherein the top mode represents a coding condition of the top field-coded data;

(e3) coding the bottom field to generate a bottom mode and bottom field-coded data, wherein the bottom mode represents a coding condition of the bottom field-coded data;

(e4) modifying the bottom mode based on the top mode to generate a modified bottom mode; and (e5) attaching the top mode to the modified bottom mode to generate a field mode.

3. The method according to claim 1, wherein the step (d) includes the steps of:

(d1) motion estimating and compensating the target block with reference to one or more previous pictures of the current picture to thereby generate motion vector information including a motion vector and a motion compensated block, wherein the motion compensated block includes a most similar block of the target block;

(d2) calculating a motion compensation error(MCE) between the target block and the most similar block and a motion vector difference(MVD) between the motion vector and its predictor;

(d3) creating a MVD signal, wherein the MVD signal indicates whether or not the MVD is zero;

(d4) encoding the MVD, if the MVD is not zero, to generate MVD data;

(d5) setting a no_update signal, wherein the no_update signal indicates whether or not the MCE is smaller than the predetermined threshold;

(d6) if the MCE is not smaller than the predetermined threshold, producing intra-coded data and inter-coded data, wherein the intra-coded data is generated by encoding the pixels of the target block based on predetermined pixels of the current picture and the inter-coded data is provided by encoding the pixels of the target block based on preset pixels included in the current picture and the motion compensated block;

(d7) generating an intra/inter signal, wherein the intra/inter signal is generated when either the intra-coded data or the inter-coded data is selected; and (d8) determining the frame mode based on the MVD signal, the no_update signal and/or the intra/inter signal.

4. The method according to claim 3, wherein the step (d7) has the steps of:

(d71) calculating the number of bits of the intra-coded data and that of the inter-coded data;

(d72) comparing the numbers of bits each other to select a smaller number of bits;

(d73) in response to the smaller number of bits, producing the intra/inter signal, wherein the intra/inter signal tells whether or not the number of bits of the intra-coded data is smaller than that of the inter-coded data; and (d74) in response to the intra/inter signal, providing either the intra-coded data or the inter-coded data as the frame-coded data.

5. The method according to claim 3, wherein the intra-coded data is provided by an intra-context based arithmetic encoding(CAE) method and the inter-coded data is provided by an inter-CAE method.

6. The method according to claim 2, wherein the steps (e2) and (e3) have the steps of:

(e21) generating a first field indication signal if error of the top/bottom field with respect to a first reference field is not greater than a predetermined threshold, and generating a second field indication signal if error of the top/bottom field with respect to a second reference field is not greater than a predetermined threshold, the respective reference fields having M/2×N pixels and all pixels of the first and the second reference fields being of the first and the second binary values, respectively;

(e22) if the first and the second field indication signals are not generated in step (e21), motion estimating and compensating the top/bottom field with reference to one or more previous pictures of the current picture to thereby generate motion vector information including a motion vector and a motion compensated field, wherein the motion compensated field includes a most similar field of the top/bottom field;

(e23) calculating a motion compensation error(MCE) between the top/bottom field and the most similar field and a motion vector difference(MVD) between the motion vector and its predictor;

(e24) creating a field MVD signal, wherein the field MVD signal indicates whether or not the MVD is zero;

(e25) encoding the MVD, if the MVD is not zero, to generate MVD data;

(e26) setting a field no_update signal, wherein the field no_update signal indicates whether or not the MCE is smaller than the predetermined threshold;

(e27) if the MCE is not smaller than the predetermined threshold, producing field intra-coded data and field inter-coded data, wherein the field intra-coded data is generated by encoding the pixels of the top/bottom field based on predetermined pixels of the current picture and the field inter-coded data is provided by encoding the pixels of the top/bottom field based on preset pixels included in the current picture and the motion compensated field;

(e28) generating a field intra/inter signal, wherein the field intra/inter signal is generated when either the field intra-coded data or the field inter-coded data is selected; and (e29) determining the field mode based on the first/second field indication signal, the field MVD signal, the field no_update signal and/or the field intra/inter signal.

7. The method according to claim 6, wherein the step (e28) contains the steps of:

(e281) calculating the number of bits of the field intra-coded data and that of the field inter-coded data;

(e282) comparing the numbers of bits each other to select a smaller number of bits;

(e283) in response to the smaller number of bits, producing the field intra/inter signal, the field intra/inter signal represents either of the field intra-coded data and the field inter-coded data; and (e284) in response to the field intra/inter signal, providing either the field intra-coded data or the field inter-coded data as the field-coded data.

8. The method according to claim 6, wherein the intra-coded data is provided by an intra-context based arithmetic encoding(CAE) method and the inter-coded data is provided by an inter-CAE method.

9. An apparatus for encoding mode signals of a target block of a binary shape signal, wherein the binary shape signal includes a plurality of pictures, each picture is divided into a multiplicity of blocks of M×N pixels having one of a first and a second binary values and the target block is encoded by either a frame-based coding to be encoded on an M×N pixels basis or a field-based coding to be encoded on an M/2×N pixels basis, the target block representing one of the blocks of a current picture to be encoded and M and N being positive even integers, respectively, comprising:

block detection means for generating a first indication signal, if error of the target block with respect to a first reference block is not greater than a predetermined threshold, and generating a second indication signal, if error of the target block with respect to a second reference block is not greater than the predetermined threshold, the respective reference blocks having M×N pixels and all pixels of the first and the second reference blocks being of the first and the second binary values, respectively;

mode selection means for selecting either the frame-based coding or the field-based coding to generate a coding mode signal, wherein the coding mode signal indicates whether the target block is encoded by using either the frame-based coding or the field-based coding;

frame-based coding means, in response to the coding mode signal, for coding the target block by the frame-based coding to generate a frame mode and frame-coded data, wherein the frame mode represents a coding condition of the frame-coded data;

field-based coding means, in response to the coding mode signal, for coding the target block by the field-based coding to generate a field mode and field coded data; and multiplexor for combining the base mode and the frame mode or the field mode to generate a mode signal for transmission of the target block.

10. The apparatus according to claim 9, wherein the frame-based coding means includes:

block divider for dividing the target block into a top field and a bottom field, wherein the top field contains every odd row of the target block to have M/2×N pixels and the bottom field contains every even row of the target block to have M/2×N pixels;

top field encoder for coding the top field to generate a top mode and top field-coded data, wherein the top mode represents a coding condition of the top field-coded data;

bottom field encoder for coding the bottom field to generate a bottom mode and bottom field-coded data, wherein the bottom mode represents a coding condition of the bottom field-coded data;

means for modifying the bottom mode based on the top mode to generate a modified bottom mode; and means for attaching the top mode to the modified bottom mode to generate a field mode.

11. The apparatus according to claim 9, wherein frame-based coding means includes:

means for motion estimating and compensating the target block with reference to one or more previous pictures of the current picture to thereby generate motion vector information including a motion vector and a motion compensated block, wherein the motion compensated block includes a most similar block of the target block;

means for calculating a motion compensation error(MCE) between the target block and the most similar block and a motion vector difference(MVD) between the motion vector and its predictor;

means for creating a MVD signal, wherein the MVD signal indicates whether or not the MVD is zero;

means for encoding the MVD, if the MVD is not zero, to generate MVD data;

means for setting a no_update signal, wherein the no_update signal indicates whether or not the MCE is smaller than the predetermined threshold;

means for producing intra-coded data and inter-coded data, if the MCE is not smaller than the predetermined threshold, wherein the intra-coded data is generated by encoding the pixels of the target block based on pre-determined pixels of the current picture and the inter-coded data is provided by encoding the pixels of the target block based on preset pixels included in the current picture and the motion compensated block;

means for generating an intra/inter signal, wherein the intra/inter signal is generated when either the intra-coded data or the inter-coded data is selected; and means for determining the frame mode based on the MVD signal, the no_update signal and/or the intra/inter signal.

12. The apparatus according to claim 11, wherein the producing means has:

means for calculating the number of bits of the intra-coded data and that of the inter-coded data;

means for comparing the numbers of bits each other to select a smaller number of bits;

in response to the smaller number of bits, means for producing the intra/inter signal, wherein the intra/inter signal tells whether or not the number of bits of the intra-coded data is smaller than that of the inter-coded data; and in response to the intra/inter signal, means for providing either the intra-coded data or the inter-coded data as the frame-coded data.

13. The apparatus according to claim 11, wherein intra-coded data is provided by an intra-context based arithmetic encoding(CAE) method and the inter-coded data is provided by an inter-CAE method.

14. The apparatus according to claim 10, wherein the top/bottom field encoder has:

means for generating a first field indication signal if error of the top/bottom field with respect to a first reference field is not greater than a predetermined threshold, and generating a second field indication signal if error of the top/bottom field with respect to a second reference field is not greater than a predetermined threshold, the respective reference fields having M/2×N pixels and all pixels of the first and the second reference fields being of the first and the second binary values, respectively;

means for motion estimating and compensating the top/bottom field with reference to one or more previous pictures of the current picture, if the first and the second field indication signals are not generated, to thereby generate motion vector information including a motion vector and a motion compensated field, wherein the motion compensated field includes a most similar field of the top/bottom field;

means for calculating a motion compensation error(MCE) between the top/bottom field and the most similar field and a motion vector difference(MVD) between the motion vector and its predictor;

means for creating a field MVD signal, wherein the field MVD signal indicates whether or not the MVD is zero;

means for encoding the MVD, if the MVD is not zero, to generate MVD data;

means for setting a field no_update signal, wherein the field no_update signal indicates whether or not the MCE is smaller than the predetermined threshold;

means for producing field intra-coded data and field inter-coded data, if the MCE is not smaller than the predetermined threshold, wherein the field intra-coded data is generated by encoding the pixels of the top/bottom field based on predetermined pixels of the current picture and the field inter-coded data is provided by encoding the pixels of the top/bottom field based on preset pixels included in the current picture and the motion compensated field;

field intra/inter signal generator for generating a field intra/inter signal, wherein the field intra/inter signal is generated when either the field intra-coded data or the field inter-coded data is selected; and means for determining the field mode based on the first/second field indication signal, the field MVD signal, the field no_update signal and/or the field intra/inter signal.

15. The apparatus according to claim 14, wherein the field intra/inter signal generator contains:

means for calculating the number of bits of the field intra-coded data and that of the field inter-coded data;

means for comparing the numbers of bits each other to select a smaller number of bits;

in response to the smaller number of bits, means for producing the field intra/inter signal, the field intra/inter signal represents either of the field intra-coded data and the field inter-coded data; and in response to the field intra/inter signal, means for providing either the field intra-coded data or the field inter-coded data as the field-coded data.

16. The apparatus according to claim 14, wherein the intra-coded data is provided by an intra-context based arithmetic encoding(CAE) method and the inter-coded data is provided by an inter-CAE method.

* * * * *